Jan. 18, 1944.  A. D. McDUFFIE  2,339,714
LUBRICATING AND COOLING ARRANGEMENT
Filed Dec. 7, 1942

Inventor
Archie D. McDuffie
By Blackmor, Spencer & Flint
Attorneys

Patented Jan. 18, 1944

2,339,714

UNITED STATES PATENT OFFICE 2,339,714

LUBRICATING AND COOLING ARRANGEMENT

Archie D. McDuffie, Berkley, Mich., assignor to General Motors Corporation, Detroit, Mich., a corporation of Delaware Application December 7, 1942, Serial No. 468,056

2 Claims. (Cl. 184—6)

This invention relates to means for lubricating and cooling the bearing surfaces between a crankpin and the connecting rods of a radial engine with slipper type connecting rods.

Conventional connecting rod bearings are cylindrical and completely surround the crankpin, and it is common practice to provide an oil duct or ducts through the crankshaft to the bearing surfaces of the crankpin and connecting rod to lubricate these surfaces which are at the same time cooled by the oil which flows through the unloaded side of the bearing in sufficient quantity to effect this.

In engines with slipper type connecting rods, which retain only the more or less loaded portion of a cylindrical bearing, the conventional oil duct directing oil radially outwards from the crankpin is necessarily uncovered in each revolution of the crankpin as many times as there are connecting rods, and the oil which is projected away from the bearing at these times cannot lubricate or cool the bearing except by splash or rebound from adjacent surfaces.

Moreover and especially in two cycle engines in which there is no reversal of the loads on the connecting rods which are consequently always in compression, throughout the expansion and compression strokes, little or no oil can flow from the duct in the crankpin to the bearing surfaces of the slipper ends of the connecting rods when the duct is covered by the slipper ends, and the lubricating oil which falls on the crankpin by splash or rebound from adjacent surfaces has to be relied on to maintain an oil film between the bearing surfaces.

The object of the invention is to provide means for supplying oil to the bearing surfaces of the crankpin and the slipper ends of the connecting rod in sufficient quantity, and in a particular way, adequately to lubricate their bearing surfaces and cool the parts.

A more specific object of the invention is a means of projecting oil directly onto that part of the crankpin surface which is successively exposed before it is covered by the slipper ends of the respective connecting rods when they are respectively at and about the ends of their expansion or power strokes and the load thereon is least.

The above and other objects of the invention will be apparent as the description proceeds.

According to the invention, oil under pressure in a duct through the crankshaft has an outlet in the crank cheek at a point remote from the crankpin, through which outlet lubricating oil is projected onto the crankpin and the slipper ends of the connecting rods.

The drawing shows a construction according to the invention for two crankpins of a two-cycle engine with two banks of four cylinders at 90° to each other, having four slipper type connecting rods on each crankpin.

Figure 1:
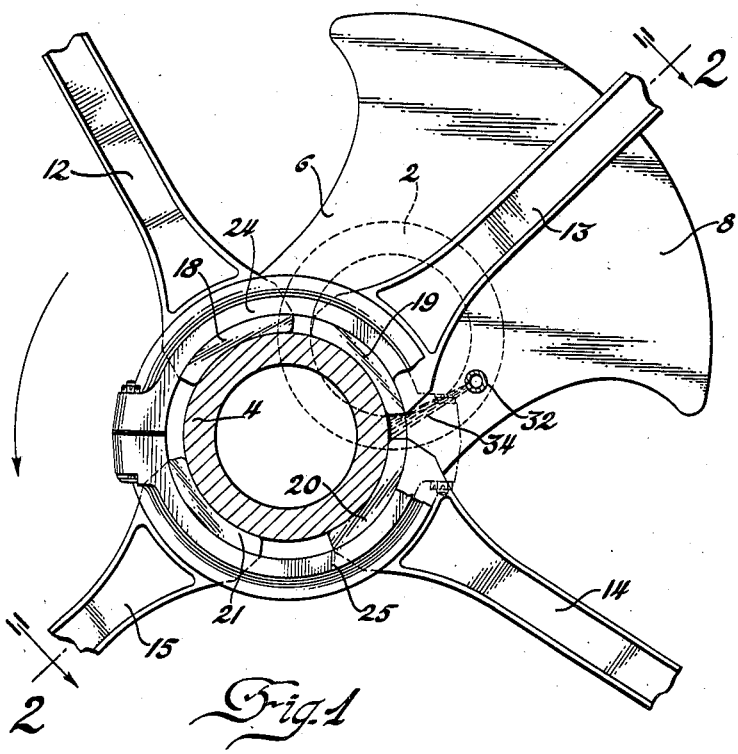
Figure 1 is a view on line 1—1 of Figure 2, and shows the four connecting rods of one bank of cylinders in their respective instantaneous positions relative to the position of the crankpin illustrated.

The engine crankshaft 1 has main journals 2 and 3 and crankpins 4 and 5 between crank webs or cheeks 6 and 7.

Diametrically opposite the crankpins on the crankshaft are balance weights 8 and 9 on the crank cheeks 6 and 7, and a balance weight 10 between the crankpins 4 and 5.

Connecting rods 12, 13, 14 and 15 to pistons in their cylinders (not shown) are respectively provided with slipper ends 18, 19, 20 and 21 on the crankpin 4, and are retained in bearing engagement therewith by retaining ring bearings 24 and 25. It will be appreciated that there are similar connecting rods (not shown) to the crankpin 5.

Figure 2:
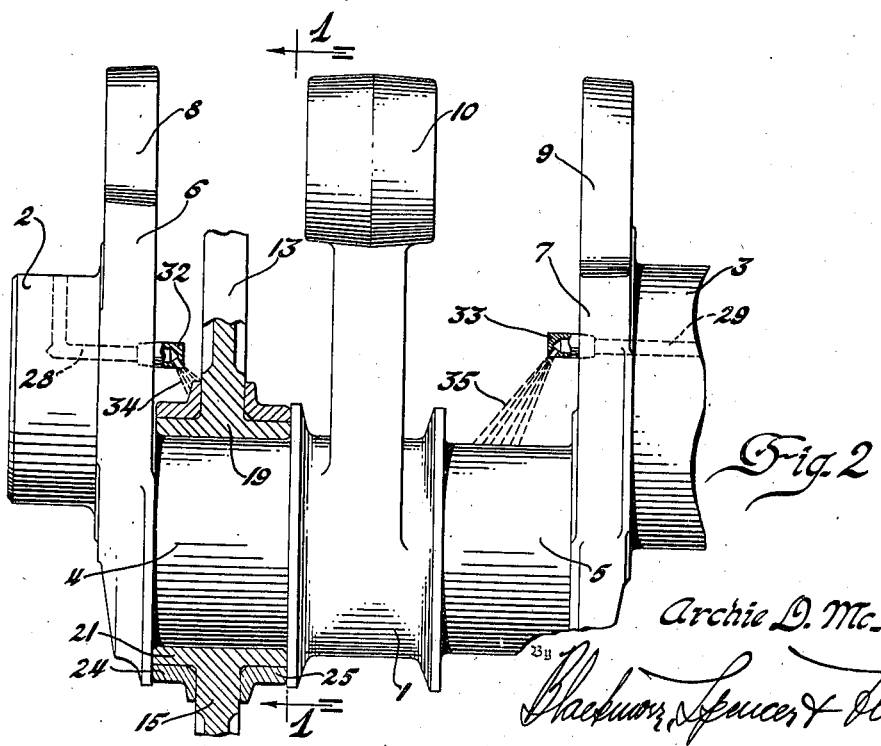
Figure 2 is a view with parts in section on line 2—2 of Figure 1.

The main journals 2 and 3 are lubricated in conventional manner (not shown) by oil under pressure from a suitable source of supply, and as shown in Figure 2, ducts 28 and 29 convey this oil under pressure from the main journals 2 and 3 through the crank cheeks 6 and 7 respectively to outlet nozzles 32 and 33 on the crank cheeks, in a position in which they can project jets 34 and 35 of lubricating oil onto the respective crankpin and connecting rod assemblies.

The nozzles 32 and 33 are preferably on the leading side of the crank cheeks in the direction of rotation of the crankshaft. Figure 1 clearly shows the nozzle 32 to be so placed, in a position from which the oil can be projected directly onto that intermittently uncovered part of the crankpin which is successively exposed in advance of the leading edge of the slipper ends of the respective connecting rods when they are respectively at and about the ends of their power strokes and the load thereon is least. The oil is thus supplied to the right place at the best time for establishing an oil film between the slipper ends and the crankpin. In the instantaneous position of the parts shown in Figure 1, the oil jet 34 from the nozzle 32 is being projected directly onto the crankpin 4 in advance of the leading edge of the slipper end 19 of the connecting rod 13, which is at the end of its power stroke, in a position in which it overlaps the main journal and is in line with the centers of the main journal and the crankpin. As the crankshaft is turned and the connecting rods 12, 15 and 14 successively in their turn assume this same position in relation to the crankshaft, the oil jet 34 is projected onto the crankpin in advance of the leading edges of their respective slipper ends 18, 21 and 20.

It will be understood that the oil jet 34 from the nozzle 32 is continuously projected towards the same part of the surface of the crankpin, and against the retaining ring bearings 24 and 25, and against the slipper ends of the connecting rods when they intervene between the jet and the crankpin, thereby effectively cooling as well as lubricating these parts.

I claim:

1. In an engine having a crankshaft with a crankpin and crank cheeks, connecting rods with slipper ends on the crankpin, exposed surfaces of the crankpin between the slipper ends, and a retaining ring bearing around the slipper ends, means for cooling these parts and lubricating the bearing surfaces between them, including a lubricating oil outlet on the crank cheek from which a jet of oil is projected towards the crankpin and connected parts, and directly onto a part of the surface of the crankpin which is successively uncovered by the respective slipper ends of the connecting rods.

2. The combination according to claim 1 in which the lubricating oil outlet is on the leading side of the crank cheek in a position from which the oil can be projected in a direction toward the crankpin such that it will impinge directly on that intermittently uncovered part of the crankpin which is successively exposed in advance of the leading edge of the slipper ends of the respective connecting rods when they are respectively at and about the ends of their power strokes and the load thereon is least.

ARCHIE D. McDUFFIE.